US009227716B2

(12) United States Patent
Heer

(10) Patent No.: US 9,227,716 B2
(45) Date of Patent: Jan. 5, 2016

(54) RUDDER PROPELLER

(75) Inventor: Manfred Heer, Landkern (DE)

(73) Assignee: Schottel GmbH, Spay (DE)

( * ) Notice: Subject to any disclaimer, the term of this patent is extended or adjusted under 35 U.S.C. 154(b) by 101 days.

(21) Appl. No.: 13/980,546

(22) PCT Filed: Jan. 5, 2012

(86) PCT No.: PCT/EP2012/050146
§ 371 (c)(1),
(2), (4) Date: Jul. 18, 2013

(87) PCT Pub. No.: WO2012/098021
PCT Pub. Date: Jul. 26, 2012

(65) Prior Publication Data
US 2013/0295801 A1 Nov. 7, 2013

(30) Foreign Application Priority Data
Jan. 20, 2011 (DE) .......................... 10 2011 009 071

(51) Int. Cl.
*B63H 25/42* (2006.01)
*F16H 1/48* (2006.01)
*B63H 23/02* (2006.01)
*B63H 23/34* (2006.01)
*F16H 37/08* (2006.01)

(52) U.S. Cl.
CPC .................. *B63H 25/42* (2013.01); *F16H 1/48* (2013.01); *B63H 2023/0283* (2013.01); *B63H 2023/342* (2013.01); *F16H 37/084* (2013.01)

(58) Field of Classification Search
CPC ................ B63H 2023/342; B63H 2023/0283; F16H 1/48; F16H 1/2818; F16H 1/2836
See application file for complete search history.

(56) References Cited

U.S. PATENT DOCUMENTS

| 3,839,922 A | * | 10/1974 | Hiersig et al. | ................... 74/410 |
| 4,268,231 A | * | 5/1981 | Corwin et al. | ................... 418/60 |
| 4,271,928 A | | 6/1981 | Northern | |
| 4,384,498 A | | 5/1983 | Eichinger | |
| 2013/0295801 A1 | | 11/2013 | Heer | |

FOREIGN PATENT DOCUMENTS

| CH | 393 961 A | 6/1965 |
| DE | 2 110 252 A1 | 9/1972 |
| DE | 28 43 459 A1 | 4/1980 |
| DE | 35 16 604 A1 | 11/1986 |
| DE | 36 24 268 A1 | 1/1988 |
| DE | 44 45 413 A1 | 4/1996 |
| EP | 2 221 510 A1 | 8/2010 |
| GB | 983462 A | 2/1965 |
| WO | WO 2010/150046 A1 | 12/2010 |

* cited by examiner

*Primary Examiner* — Edwin Swinehart
(74) *Attorney, Agent, or Firm* — Pauley Erickson & Kottis

(57) ABSTRACT

A rudder propeller including a drive shaft and a propeller shaft that can be driven by the drive shaft by an angular drive and a planetary gear that can be located on the propeller shaft and including a sun gear that is connected to the angular drive via a coupling, a fixed ring gear and planet gears that revolve between the sun gear and ring gear and that are mounted on a planet carrier. The planet carrier can be secured against torque to the propeller shaft and the coupling between the angular drive and the sun gear can be designed as a double cardanic, rotationally-fixed flexible coupling, in such a way that radial and angular displacements of the sun gear in relation to the angular drive can be compensated.

11 Claims, 2 Drawing Sheets

RUDDER PROPELLER

BACKGROUND OF THE INVENTION

1. Field of the Invention

This invention relates to a rudder propeller with a drive shaft and a propeller shaft that can be driven by the drive shaft by an angular drive and a planetary gearing, the planetary gearing can be situated on the propeller shaft and include a sun gear connected to the angular gear by a coupling, a stationary ring gear, and planet gears that are mounted on a planet carrier and travel between the sun gear and the ring gear, and the planet carrier can be mounted to the propeller shaft in a torsionally rigid fashion.

2. Discussion of Related Art

Rudder propellers of the type mentioned above are known, for example, from German Patent Reference DE 28 43 459 A1. The rudder propeller is used to drive and steer a watercraft. The motor torque of a drive motor, which is usually situated inside the watercraft, is transmitted via a vertically extending drive shaft and an angular drive, which has a planetary gearing connected downstream of it, to the horizontally extending propeller shaft, which supports the propeller. The angular drive and the planetary gearing are accommodated in a shared housing that is situated outside the hull and can be rotated around the vertical axis for purposes of steering the watercraft. Thus, the aim is to make this housing as streamlined as possible, such as with small external dimensions, which places limitations on the dimensions of the propeller shaft bearings and other parts inside the housing. On the other hand, the planetary gearing is subject to considerable loads during operation of the rudder propeller, for example, due to the axial pressure of the propeller on the propeller shaft and the deflection curve that occurs in the propeller shaft due to the weight of the propeller. To achieve the most uniform possible distribution of load to the planet gears of the planetary gearing despite the occurrence of these forces, it is known to provide a coupling between the sun gear and the angular drive, such as a set of coupling teeth that engage a set of internal teeth provided in the angular drive. This achieves a suspension of the sun gear through the guidance of the teeth, which gives the sun gear a certain ability to radially compensate for forces that occur. However, this suspension of the sun gear does not counteract an angular offset between the sun gear and the angular drive so that a coupling of this kind known from the prior art is not only complex, but also is still subject to wear, a situation which appears in need of improvement.

SUMMARY OF THE INVENTION

One object of this invention is to provide a rudder propeller of the type mentioned above, in which simple structural measures produce the most wear-free possible suspension of the sun gear in order to compensate for loads acting on the planetary gearing.

In order to attain the stated object, in some embodiments of this invention a rudder propeller has features, advantageous embodiments and modifications as described in this specification and the claims.

According to this invention, the coupling between the angular drive and the sun gear is in the form of a double-cardanically functioning, rotationally fixed compensation coupling so that it is possible to compensate for radial and angular displacements of the sun gear relative to the angular drive. With such an embodiment, it is possible to implement a virtually wear-free double-cardanic suspension of the sun gear that is able to reliably compensate for the loads occurring during operation of a rudder propeller, in particular the compressive force of the propeller on the propeller shaft and deflection of the propeller shaft, and advantageously requires only a relatively small amount of space.

According to one embodiment of this invention, the rotationally fixed compensation coupling is in the form of a curved-tooth coupling. The curved-tooth arrangement or principle permits the avoidance of edge loading phenomena in the teeth when radial and angular displacements occur so that such a curved-tooth coupling operates in a virtually wear-free fashion.

According to another embodiment of this invention, the rotationally fixed compensation coupling is in the form of a diaphragm coupling, which in order to ensure the double-cardanic suspension, is embodied in a dual arrangement, for example, with two diaphragm components connected via a middle piece. Even with such an inexpensively producible diaphragm coupling, it is possible to ensure the desired double-cardanic suspension of the sun gear despite the relatively small overall size.

To further improve the load compensation and force absorption of planetary gearing used in the rudder propeller according to this invention, it is also possible for the ring gear to be mounted in the housing by elastically deformable flex pins so that radial and tangential forces on the ring gear can be absorbed by the flex pins.

According to one embodiment of this invention, the flex pins can be shaped or formed as a taper-cut in the longitudinal direction, with a diameter that increases from the ends toward the middle of its longitudinal span. The flex pins are inserted into axial through bores in the ring gear, with their respective ends protruding from the ring gear and the protruding ends engage in corresponding recesses in the housing.

In this connection, the flex pins are situated with as little play as possible, ideally or theoretically with no play, in the ring gear and the housing.

The flex pins secure the ring gear only against rotating in the housing, but not against axial movements.

The use of the above-described flex pins gives the ring gear a radial displaceability, which improves the load compensation between the individual tooth engagements of the planetary gearing. The flex pins can be easily and inexpensively produced, thus on the whole yielding a rudder propeller with a significantly improved wear behavior while only slightly increasing structural complexity.

BRIEF DESCRIPTION OF THE DRAWINGS

Other embodiments and details of this invention are explained in greater detail below in conjunction with the exemplary embodiments shown in the drawings, wherein.

DETAILED DESCRIPTION OF THE INVENTION

Figure 1:
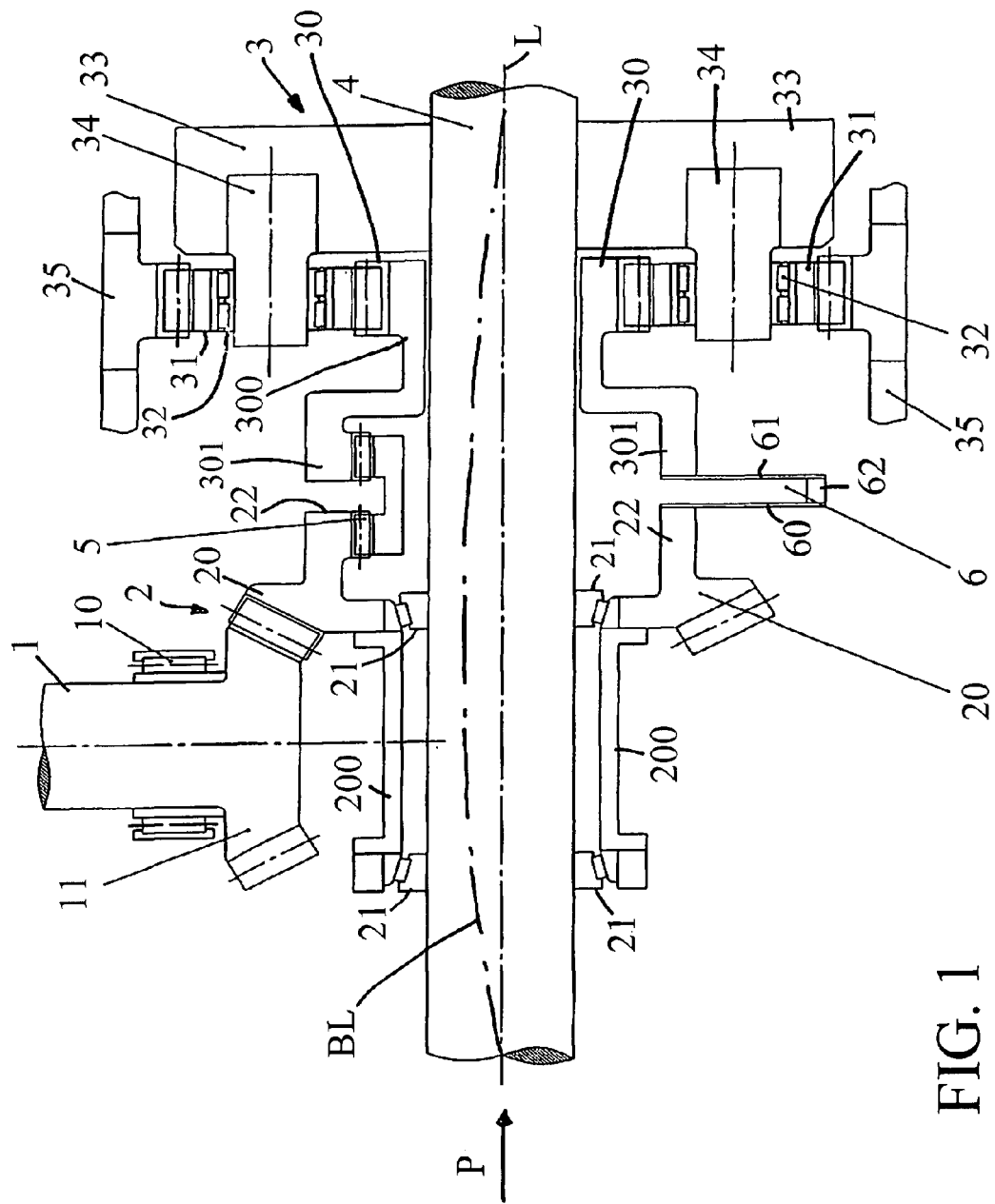
FIG. 1 is a schematic view of the drive devices in a rudder propeller according to this invention, showing two alternative embodiments in the single view.

FIG. 1 shows the drive of a rudder propeller of an intrinsically known design in a schematic view showing only parts of an overall mechanism. The basic drive principle is known, for example, from German Patent Reference DE 28 43 459 A1, the entire description of which is included in this specification by reference.

Element reference numeral 1 indicates a vertically extending drive shaft 1 that extends down through or out of a hull and is set into rotation by a drive motor that is not shown in detail. The drive shaft 1 is supported by a pivot bearing 10 and at its end, has a pinion 11, which is a component of an angular drive 2 that is explained in greater detail below.

Element reference numeral 4 indicates a propeller shaft, which extends at right angles to the drive shaft 1 and, in a manner not shown in detail, supports a propeller for propulsion of the watercraft at its left end in the drawing of FIG. 1.

The drive motor, not shown, rotates the drive shaft 1 to drive the propeller shaft 4 in the manner explained below, achieving a reduction in the speed of the drive shaft 1.

First, the drive shaft 1, with its pinion 11 as a component of the angular drive 2, drives a bevel gear 20, which is supported on a hollow shaft 200 by bearings 21 so that it is able to rotate freely around the propeller shaft 4. At its end 22 oriented away from the drive shaft 1, the bevel gear 20 has a set of internal teeth that are operatively connected via a coupling, which will be explained in greater detail below, to a sun gear 30 of a planetary gearing 3 in order to drive the latter. The sun gear 30 likewise has a hollow shaft 300, which at its end 301 oriented toward the end 22 of the pinion 20, has a set of internal teeth that are engaged by the rotationally fixed compensation coupling, which is explained in greater detail below.

As another component, the planetary gearing 3 includes a ring gear 35, which is mounted in a housing in a rotationally fixed manner by means not shown, and a plurality of planet gears 31, which are supported on a planet carrier 33 by planet axles 34 protruding from the planet carrier and which are supported in rotary fashion on the planet gear axles 34 by planet bearings 32 and rotate in an intrinsically known fashion between the sun gear 30 and the ring gear 35. The planet carrier 33 is secured to the propeller shaft 4 in a rotationally fixed fashion, for example by being shrink-fitted onto it. It is thus evident that the angular drive 2 and the planetary gearing 3 produce a reduction in the rotation speed of the drive shaft 1 as it is transferred to the propeller shaft 4.

In the operation of a rudder propeller, however, it can be problematic if the longitudinal line or axis L of the propeller shaft 4 does not extend in an idealized straight line, but rather due to the compressive force P that the propeller exerts on the propeller axle 4 and the high own weight of the propeller that exerts a load on the propeller shaft 4, a curve in accordance with the deflection curve BL occurs, which for the sake of clarity, is shown in exaggerated fashion in the drawing according to FIG. 1. In order to thus ensure a satisfactory tooth engagement of the planetary gearing 3 given the existence of such a deflection curve BL, the above-mentioned rotationally fixed compensation coupling is provided between the angular drive 2 and the sun gear 30. In the drawing according to FIG. 1, two alternative embodiments are shown at the same time, a curved-tooth coupling 5 above the center axis L and a diaphragm coupling 6 below the center axis L, which can be used alternatively.

When a curved-tooth coupling 5 is used as the rotationally fixed compensation coupling, this sleeve, which has an approximately U-shaped cross-section, has two legs whose ends engage by corresponding curved teeth with the internal teeth at the end 22 of the pinion 20 and the internal teeth at the end 301 of the sun gear 30. With the double-cardanic operation of such a curved-tooth coupling 5 that is inherent in the curved-tooth arrangement or principle, it is possible to compensate for both radial and angular displacements of the sun gear 30 relative to the bevel gear 20 of the angle drive 2. This results in a significantly homogenized tooth engagement inside the planetary gearing 3 despite the indicated deflection curve BL of the center axis, as a result of which the planetary gearing 3 and the curved-tooth coupling 5 operate in a virtually wear-free manner.

In the embodiment alternatively shown below the center line L, a diaphragm coupling 6 embodied in a dual arrangement is used as the rotationally fixed compensation coupling. The diaphragm coupling likewise has a double-cardanic operation and compensates for both radial and angular displacements of the sun gear 30 relative to the bevel gear 20. In this case, the ends 22 and 301 of bevel gear 20 and sun gear 30, respectively, do not have internal teeth, but instead each have a diaphragm component 60, 61 comprising a suitable material. The diaphragm components 60, 61 are connected to each other by a middle piece 62 and due to the flexibility inherent in the diaphragm components 60, 61, are able to compensate for radial and angular displacements and also axial forces, which results in an extremely smooth, wear-free operation of the planetary gearing 3.

Figure 2:
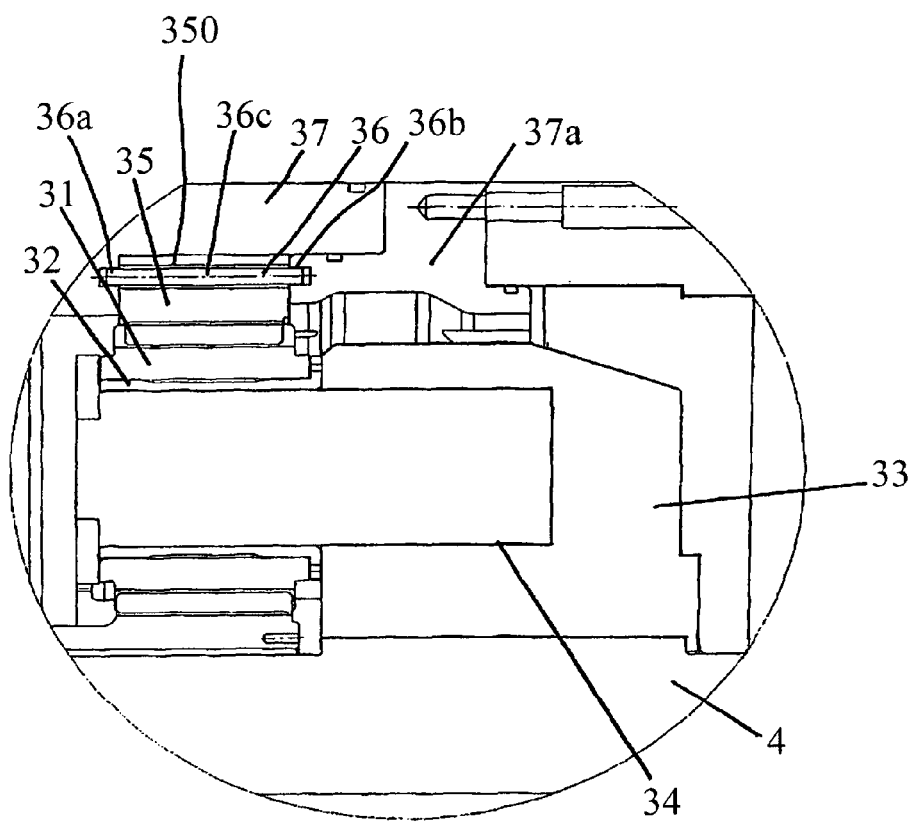
FIG. 2 shows some details of the support of the ring gear of the planetary gearing according to FIG. 1.

A further increase in load tolerance is achieved by a special or particular mounting of the stationary ring gear 35 inside the housing, as shown in FIG. 2.

The housing is labeled with the reference numeral 37 in FIG. 2 and the reference numeral 37a indicates a housing bell that can be screwed into the housing and in the installed state shown, also constitutes or forms a component of the stationary housing 37.

Close to its outer circumference, the ring gear 35 has through bores 350 extending axially, for example, parallel to the planet gear axles 34 and also parallel to the propeller shaft 4, that accommodate the flex pins 36 and secure the ring gear 35 against rotation.

The flex pins 36 are not provided with a cylindrical outer diameter, but are instead slightly taper-cut so that their diameter increases from their ends 36a, 36b toward the middle section of their longitudinal span 36c. Consequently, the greatest diameter is situated or positioned in the vicinity of or near the middle section of the longitudinal span 36c. With this maximum diameter in the middle section of the longitudinal span 36c, the flex pin 36 is accommodated with as little play as possible inside the through bore 350 in the ring gear 35 and is of such a length that the ends 36a, 36b protrude from the ring gear 35 at its periphery and at these locations, are accommodated likewise without play in corresponding receiving bores of the housing 37 and the associated housing bell 37a. The outer diameter of the ring gear 35 is not accommodated in the housing 37 with a tight fit, but is instead able to move. The flex pins 36 do, however, secure it against rotating. As a result, the ring gear is axially fixed, but the elastically deformable flex pins 36 can absorb both radial and tangential forces on the ring gear in a simple manner. In this regard, a further improvement in tooth flank engagement inside the planetary gearing is achieved with a comparatively low structural complexity despite the occurrence of loads and deformations induced by the propeller shaft 4.

This invention yields a rudder propeller that can operate in a virtually wear-free fashion, even under continuous operation at high loads, despite its small overall size and inexpensive construction.

The invention claimed is:

1. A rudder propeller comprising a drive shaft (1) and a propeller shaft (4) driveable by the drive shaft (1) via an angular drive (2) and a planetary gearing (3), the planetary gearing (3) positioned on the propeller shaft (4) and comprising a sun gear (30) connected to the angular gear (2) via a coupling, a stationary ring gear (35), and planet gears (31) mounted on a planet carrier (33) and traveling between the sun gear (30) and the ring gear (35), and the planet carrier (33)

connected to the propeller shaft (4) in a torsionally rigid manner, the coupling between the angular drive (2) and the sun gear (30) having a double-cardanically functioning, rotationally fixed compensation coupling (5, 6) for compensation of radial and angular displacements of the sun gear (30) relative to the angular drive (2), wherein the ring gear (35) is mounted in a housing (37, 37*a*) by elastically deformable flex pins (36) so that radial and tangential forces on the ring gear (35) are absorbed by the flex pins (36).

2. The rudder propeller according to claim 1, wherein a curved-tooth coupling (5) is the rotationally fixed compensation coupling.

3. The rudder propeller according to claim 1, wherein a diaphragm coupling (6) is the rotationally fixed compensation coupling.

4. The rudder propeller according to claim 1, wherein the flex pins (36) are taper-cut in a longitudinal direction with a diameter that increases from ends (36*a*, 36*b*) toward a middle of a longitudinal span (36), and are inserted into axial through bores (350) in the ring gear (35) with their respective ends (36*a*, 36*b*) protruding from the ring gear (35) and engaging in the housing (37, 37*a*).

5. The rudder propeller according to claim 1, wherein the flex pins (36) are supported without play in the ring gear (35) and the housing (37, 37*a*).

6. The rudder propeller according to claim 4, wherein the flex pins (36) are supported without play in the ring gear (35) and the housing (37, 37*a*).

7. A rudder propeller comprising a drive shaft (1) and a propeller shaft (4) driveable by the drive shaft (1) via an angular drive (2) and a planetary gearing (3), the planetary gearing (3) positioned on the propeller shaft (4) and comprising a sun gear (30) connected to the angular gear (2) via a coupling, a stationary ring gear (35), and planet gears (31) mounted on a planet carrier (33) and traveling between the sun gear (30) and the ring gear (35), and the planet carrier (33) connected to the propeller shaft (4) in a torsionally rigid manner, the coupling between the angular drive (2) and the sun gear (30) having a double-cardanically functioning, rotationally fixed compensation coupling (5, 6) for compensation of radial and angular displacements of the sun gear (30) relative to the angular drive (2), wherein a diaphragm coupling (6) is the rotationally fixed compensation coupling and the ring gear (35) is mounted in a housing (37, 37*a*) by elastically deformable flex pins (36) so that radial and tangential forces on the ring gear (35) are absorbed by the flex pins (36).

8. The rudder propeller according to claim 7, wherein the flex pins (36) are taper-cut in a longitudinal direction with a diameter that increases from ends (36*a*, 36*b*) toward a middle of a longitudinal span (36), and are inserted into axial through bores (350) in the ring gear (35) with their respective ends (36*a*, 36*b*) protruding from the ring gear (35) and engaging in the housing (37, 37*a*).

9. The rudder propeller according to claim 8, wherein the flex pins (36) are supported without play in the ring gear (35) and the housing (37, 37*a*).

10. The rudder propeller according to 7, wherein the flex pins (36) are supported without play in the ring gear (35) and the housing (37, 37*a*).

11. The rudder propeller according to claim 7, wherein a curved-tooth coupling (5) is the rotationally fixed compensation coupling.

\* \* \* \* \*